United States Patent
Ranganathan et al.

(10) Patent No.: US 11,773,279 B2
(45) Date of Patent: *Oct. 3, 2023

(54) OXIDATION-RESISTANT INK COMPOSITIONS AND METHODS OF USE

(71) Applicant: Independent Ink, Inc., Gardena, CA (US)

(72) Inventors: Nadeepuram K. Ranganathan, Irvine, CA (US); Barry Brucker, Beverly Hills, CA (US); Ramesh Subbaraman, Fullerton, CA (US)

(73) Assignee: Independent Ink, Inc., Gardena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,523

(22) Filed: Nov. 3, 2022

(65) Prior Publication Data

US 2023/0083402 A1 Mar. 16, 2023

Related U.S. Application Data

(63) Continuation-in-part of application No. 17/865,210, filed on Jul. 14, 2022, now Pat. No. 11,492,507.

(60) Provisional application No. 63/394,105, filed on Aug. 1, 2022, provisional application No. 63/221,848, filed on Jul. 14, 2021.

(51) Int. Cl.
| | |
|---|---|
| *C09D 11/00* | (2014.01) |
| *C09D 11/36* | (2014.01) |
| *C09D 11/322* | (2014.01) |
| *B41M 5/00* | (2006.01) |
| *C09D 11/037* | (2014.01) |
| *C09D 11/033* | (2014.01) |
| *C09D 11/102* | (2014.01) |
| *C09D 1/00* | (2006.01) |
| *C09D 4/00* | (2006.01) |
| *C09D 5/00* | (2006.01) |
| *C09K 3/00* | (2006.01) |

(52) U.S. Cl.
CPC .............. *C09D 11/36* (2013.01); *B41M 5/00* (2013.01); *C09D 11/033* (2013.01); *C09D 11/037* (2013.01); *C09D 11/102* (2013.01); *C09D 11/322* (2013.01)

(58) Field of Classification Search
CPC ....... C09D 11/00; C09D 11/36; C09D 11/033; C09D 11/037; C09D 11/102; C09D 11/322
USPC .................................. 106/31.01, 31.13, 31.6
See application file for complete search history.

(56) References Cited

U.S. PATENT DOCUMENTS

| | | | | |
|---|---|---|---|---|
| 5,981,623 | A * | 11/1999 | McCain | C09D 11/30 106/31.27 |
| 7,727,946 | B2 * | 6/2010 | Catalfamo | C11D 17/042 510/438 |
| 7,938,516 | B2 * | 5/2011 | Piatt | B41J 2/115 347/73 |
| 9,085,706 | B2 | 7/2015 | Gotou et al. | |
| 9,518,190 | B2 | 12/2016 | Gotou et al. | |
| 10,723,123 | B2 | 7/2020 | Deardurff et al. | |
| 10,920,095 | B2 | 2/2021 | Jackson et al. | |
| 11,492,507 | B1 * | 11/2022 | Ranganathan | C09D 11/033 |
| 2001/0009892 | A1 * | 7/2001 | Bonsall | C11D 3/40 510/439 |
| 2010/0215812 | A1 * | 8/2010 | Sheskey | A61K 31/167 426/89 |
| 2015/0275153 | A1 * | 10/2015 | Murphy | B65D 65/46 206/524.7 |
| 2019/0135997 | A1 * | 5/2019 | Friedrich | C08J 5/18 |

OTHER PUBLICATIONS

International Search Report in PCT/US2022/037191 dated Oct. 5, 2022.

* cited by examiner

*Primary Examiner* — James E McDonough
(74) *Attorney, Agent, or Firm* — Master Key IP, LLP; Jeromye V. Sartain

(57) ABSTRACT

Ink compositions and methods of use for reliably printing on alkaline and readily oxidizing surfaces comprise one or more pigments, one or more solvents for adjusting viscosity, surface tension, and/or heat tolerance, and water, the pigments being "loaded" in the ink sufficiently to meet the relevant color and optical density requirements for the ink while such ink composition still also meets the duty cycle requirements of the application.

24 Claims, No Drawings

OXIDATION-RESISTANT INK COMPOSITIONS AND METHODS OF USE

RELATED APPLICATIONS

This is a continuation-in-part application and so claims the benefit pursuant to 35 U.S.C. § 120 of a prior filed and co-pending U.S. Non-Provisional patent application Ser. No. 17/865,210 filed Jul. 14, 2022, and entitled "Oxidation-Resistant Ink Compositions and Methods of Use," which itself claims priority pursuant to 35 U.S.C. § 119(e) to and is entitled to the filing date of U.S. Provisional Patent Application Ser. No. 63/221,848 filed Jul. 14, 2021, and entitled "Oxidation-Resistant Inkjet Ink Composition," and further and separately claims priority pursuant to 35 U.S.C. § 119(e) to and is entitled to the filing date of U.S. Provisional Patent Application Ser. No. 63/394,105 filed Aug. 1, 2022, and entitled "Oxidation-Resistant Ink Compositions and Methods of Use." The contents of the aforementioned applications are incorporated herein by reference.

BACKGROUND

The subject of this patent application relates generally to printing, and more particularly to ink compositions and methods for printing on oxidizing and alkaline substrates or surfaces.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, in the industrial printing arts, the range of commercial printing applications and related substrates is ever increasing, and with it attendant challenges relating to printhead registration and other mechanical requirements, image quality including colorfastness, and environmental effects and regulatory compliance, each potentially exacerbated by rapid and bulk printing demands and depending on the particular printing technology employed, and each challenge then oftentimes addressed not by improvements to existing printing technologies but by new and improved ink formulations. Indeed, a variety of "irregular," rough and/or non-homogeneous substrates or surfaces are often currently printed on, from food products bearing "edible" or FDA compliant or approved food grade ink to a virtually infinite variety of curved or 3-D (versus flat or 2-D) surfaces in consumer, medical, and other contexts, each such context potentially rendering impractical or even impossible workable ink formulations for particular available printing technologies such as drop on demand ("DOD") or non-contact printing technologies including but not limited to thermal inkjet ("TIJ"), bubble inkjet ("BIJ"), continuous inkjet ("CIJ"), valve jet, and piezo or piezoelectric printheads and contact printing technologies such as pad or transfer printing. Again, to be able to print reliably and safely and with the desired resolution on certain substrates and do so in a relatively high throughput industrial context employing existing printing technologies is often difficult and requiring ink composition innovation to achieve.

One particular commercial application presenting particular challenges is printing on laundry tablets and the like, or really any alkaline or oxidizing substrate or surface. By design, such laundry tablets, for example, contain percarbonate, or more particularly percarbonate salt, or other such active ingredient or readily oxidizing agent that renders such substrates alkaline or relatively high pH and are configured to release oxygen upon wetting for higher performance in washing and stain removal, and so any ink to be applied to the tablet would have to be stable in the presence of an oxidizing agent or not oxidize or decompose and also be non-staining and readily dissolve along with the tablet itself in a washing machine or dishwasher, for example, during normal use. Similar challenges are presented in a variety of other consumer and commercial products, from laundry tablets and sheets and other fabric care products to bath and bar soaps to dishwashing tablets and descaling tablets for coffee makers and the like. Further challenges are presented due to such tablet or soap substrates or surfaces being rough and non-homogeneous, as owing to the granulated functionaries such as optical brighteners and oxygen donors, for example, typically found in detergent tablets and bath and bar soaps and the like. Similar challenges are presented printing on other oxidizing substrates such as laundry sheets. And if an inkjet printer or printing system and ink were to be employed in order to realize its attendant advantages in terms of print quality and speed, such inkjet ink would thus have to meet the substrate stability requirement, or have ink stability on readily reactive surfaces. But inkjet inks are typically waterborne or water-based inks with water wettable reactants, or constituents that react when wet, which in turn means that such inks, or the water in them, would liberate oxygen that then reacts with the other materials of the tablet or other substrate or surface and produces oxidation or instability of the ink, whether at the point of printing or more gradually over time. In addition, depending on the commercial context, high demand or high duty cycle and attendant ink heat management, color or color intensity or general image resolution, regulatory or environmental, and other such requirements must be met notwithstanding the threshold challenge of printing on an oxidizing and alkaline substrate or surface.

What has been needed and heretofore unavailable is a method of reliably printing on alkaline and readily oxidizing surfaces as by employing an ink composition that is sufficiently stable both in high duty cycle or elevated temperature contexts and stable in alkaline and oxidizing environments for commercial applications such as printing on laundry tablets or other alkaline oxidizing agent-containing substrates or surfaces while meeting all other requirements of the printer or bulk printing system and of the resulting print quality. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing oxidation-resistant ink compositions and methods of their use. In at least one embodiment, for the purpose of reliably printing on alkaline and readily oxidizing surfaces, an ink composition comprises one or more pigments, one or more solvents for adjusting viscosity, surface tension, and/or heat tolerance, and water, the pigments "loaded" in the ink sufficiently to meet the relevant color and optical density requirements for the ink while such ink composition still also meets the duty cycle requirements of the application for then being jetted or otherwise applied to the oxidizing and alkaline substrate or surface.

Other objects, features, and advantages of aspects of the present invention will become more apparent from the following detailed description, which illustrates, by way of example, the principles of aspects of the invention.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are described below in detail. It should be understood, however, that there is no intention to limit the invention to any specific form and context disclosed, but on the contrary, the inventive subject matter is to cover all modifications, alternative embodiments, and equivalents falling within the scope of any appended claims.

The subject of this patent application being printing on oxidizing and alkaline substrates or surfaces, there are disclosed oxidation-resistant ink compositions generally comprising one or more pigments, one or more solvents, and water and methods of their use in printing or otherwise applying such ink to a readily oxidizing and alkaline substrate or surface. These three ingredients or groups of ingredients may be combined in various proportions depending on the application to arrive at new and useful ink compositions according to aspects of the present invention. As used herein, an "effective amount" or "effective concentration" of any such ingredient or additive of any particular ink composition refers to the minimal percentage of a substance used in an ink composition of the present invention to achieve the desired effect. For example, an effective amount of pigment refers to the minimal percentage of pigment required to achieve the desired color and optical density for the particular application and substrate, and an effective amount of solvent refers to the minimal percentage of such solvent to achieve the desired ink application or jetting and/or heat management effect in the particular context. That is, the new and novel ink composition according to aspects of the present invention for reliably printing on alkaline and readily oxidizing surfaces is also capable of performing at high duty cycle and so under attendant elevated temperatures, in the cartridge in the inkjet context, by managing the heat within the ink itself or controlling its upper temperature limit and thereby enabling larger volumes of ink through the cartridge or larger numbers of prints by the cartridge without a failure. While specific substances in each broad category of ingredients are described as being combined in certain proportions to yield one or more particular ink compositions, it will be appreciated by those skilled in the art that the invention is not so limited. Rather, numerous other substances, now known or later developed, and combinations thereof are possible beyond those described herein according to aspects of the invention. Further, while the exemplary context and ink formulations are primarily for inkjet printing, it will be appreciated by those skilled in the art that the invention is not so limited, but instead any such ink formulation or composition according to aspects of the present invention and suitable for printing or application on an alkaline and readily oxidizing surface or substrate may be employed in not only thermal inkjet ("TIJ") contexts, whether single use or bulk cartridge printing, but also in other non-contact printing systems such as continuous inkjet ("CIJ"), drop-on-demand ("DOD"), piezo inkjet ("PZT"), large character printing ("LOP"), and micro-electro-mechanical systems ("MEMS") as well as transfer printing or contact printing such as pad printing systems. More generally, fundamental aspects of the present invention relate to printing and long-term retention of precise, on-demand, and sequentially counted images of defined color and density at high rates on readily oxidizing surfaces made of water-activated percarbonate, carbonate, and bicarbonate salts in overwhelming quantity with inks of water-based formulae.

Once again, in the exemplary commercial context of inkjet printing on laundry tablets containing readily oxidizing agents or ready oxygen donors such as percarbonates and others, which oxidizing or oxygen donating agent(s) in the tablet oxidizes the typical ink, and specifically any colorant in the ink, over time, and/or containing nascent oxygen donors, which reactively release oxygen upon wetting, even when the water is provided by the ink, wherein the ink is effectively water borne, an objective of such an oxidation-resistant inkjet ink according to aspects of the present invention is that the ink once printed on such a tablet would be relatively stable in the presence of the percarbonate or other oxidizing agent or nascent oxygen donors (the ink and the colorants in it would not oxidize). That is, any such ink must be stable in an alkaline (high pH) environment with water wettable reactants. Some pigments are known to be non-oxidizing or oxidation-resistant and thus stable in an alkaline environment, but what is not known and has not been previously achieved is employing such pigment dispersions in inkjet inks, or inks for use in non-contact printing systems, particularly on said oxidizing and alkaline surfaces with high duty cycle printing systems, which objective, among others, has been met by ink compositions according to aspects of the present invention, including but not limited to those specific compositions disclosed herein, and the methods of their use. Once more, those skilled in the art will appreciate that such challenge of printing on an oxidizing and alkaline substrate or surface is presented in a variety of other commercial contexts beyond laundry tablets containing percarbonate, carbonate, and/or bicarbonate salts, such that the ink composition of the present invention is not so limited, such laundry tablet and related inkjet printing context being illustrative and non-limiting, as will be further appreciated from the disclosures and examples further below relating to piezo or piezoelectric printheads or printing systems.

Colorants

The ink compositions of the present invention generally comprise a colorant which might be a pigment or combination thereof, i.e., a pigment or a mixture or dispersion of pigments. The said pigments are solid particles which are not soluble in water or the cosolvents specified in the exemplary ink compositions. The terms "pigment" and "colorant" are used interchangeably throughout. Any colorant in the form of a solid particle or the like that may be suspended somewhat homogeneously in the ink to achieve the targeted color and optical density may be used in the present invention. The pigments must be finely divided, all in the sub-micron range of particle size, preferably all particles below 0.5 microns (500 nanometers), substantially homogeneously dispersed in water with or without the aid of surfactants, wherein during normal use the particles do not settle by gravity or other forces, even in the long term, and the particles do not agglomerate inherently or in the presence of formulation ingredients, even in the long term. And such pigments must be capable of withstanding nascent oxidation, caused by wetting oxygen-releasing chemicals such as percarbonate, carbonate, and/or bicarbonate salts often found in detergents and soaps, in an alkaline environment (i.e., from the detergent tablet).

Examples of suitable colorants may include, but are not limited to, Pigment Yellow 155, Pigment Blue 15.3 (cyan), and Pigment Red 122 (magenta). Any such colorants may be supplied as solid particles or liquid suspensions or dispersions, though are typically in aqueous form, and of course other colors of the colorants may be employed alone or in combination to achieve a desired final ink color, in any case the weight or mass percentages for all such pigments are shown throughout based on the amount of actual pigment in the finished formulation, with all water in the case of a dispersion included in the weight percentage for water, rather than reflecting the weight percentage for the total amount of pigment dispersion "as presented" in the market.

The total colorant, represented as weight or mass percent in the finished formula of the actual pigment particles or solids, not including any aqueous component, might be present in an ink composition according to aspects of the present invention in the range of about one percent (1%) to about ten percent (10%) by weight, more preferably in the range of about one-and-a-half percent (1.5%) to about seven percent (7%) by weight, and even more preferably in the range of about two percent (2%) to about five percent (5%) by weight. The effective concentration of the colorant may depend on the percentage by weight of the colorant required in the ink composition to produce the desired color and optical density. Notably, such pigments or resulting pigment dispersions beneficially have oxidation resistance due to each pigment particle being encapsulated or coated in whole or in part by a polymer as through a chemical bond, such as achieved by physically and chemically bonding the pigment particle to a polymer, drying the joined entity and crushing it into a powder having sub-micron particle size, and then dispersing and suspending the powder of preferably uniform and narrow particle size distribution within the liquid or aqueous ink composition base. Such pigment dispersion-based ink compositions as disclosed herein thus meet the challenge of image color and resolution requirements while also meeting the oxidation-resistance and anti-kogation or high demand or duty cycle and thus the ink heat management requirements of some applications.

Solvents

Solvents suitable for the ink compositions of the present invention may comprise several types of solvents, most of which are organic, though this is not necessarily required in all applications or commercial contexts. Organic solvents suitable for the ink compositions of the present invention may include solvents used as additives to modify the properties of the ink composition, such as to adjust viscosity and to improve moisture retention and heat tolerance. Examples of such solvents include, but are not limited to, alcohols, amines, esters, glycol ethers, ketones, polyols, and keto-pyrroles.

In the exemplary embodiments of an ink composition according to aspects of the present invention particularly suited for higher duty cycle or other heat management requirements, a combination of the polyols 1,3-propanediol, 1,2-hexanediol, and propylene glycol was employed as a humectant or ingredient providing the benefit of retaining or preserving moisture and also serving as a heat management or anti-kogation agent in terms of enabling the ink to control its upper temperature limit or manage how or the limit to which it takes on heat. That is, the heat tolerance or anti-kogation capacity of the ink, or the ink's ability to mitigate against or prevent the gradual degradation or burning or charring of the printhead of an inkjet printer, such as through the particular mechanism of the polymer cladding the electrical resistor in the thermal inkjet nozzle under sustained heat, is a necessary performance requirement in some commercial relatively high duty cycle applications in order to prevent print quality degradation or premature failure of the printhead. Indeed, in exemplary formulations of such an ink composition according to aspects of the present invention, including but not limited to those examples provided further below, 1,3-propanediol and 1,2-hexanediol were together found to be sufficient in all respects in terms of the ink performance, in both single use cartridges containing on the order of 30-50 mL of ink to bulk systems supplying 1,000 mL or more of ink to the printhead, though even in bulk printing contexts the amount of ink effectively metered to the printhead being in the range of roughly 10-20 mL, for example. More particularly, the combination of 1,3-propanediol and 1,2-hexanediol, represented as weight or mass percent in the finished formula, present in an ink composition according to aspects of the present invention in the range of about one percent (1%) to about twenty-five percent by weight (25%), more preferably in the range of about three percent (3%) to about twenty percent (20%) by weight, and even more preferably in the range of about five percent (5%) to about fifteen percent (15%) by weight in exemplary ink formulations was found to be an effective amount of such solvent or anti-kogation agent particularly to meet high duty cycle industrial printing requirements, such as in an exemplary thermal inkjet context maintaining the temperature of the ink within a nominal 1,000 mL cartridge within the range of about thirty-five degrees Celsius (35° C.) to about eighty-five degrees Celsius (85° C.), more preferably within the range of about thirty-five degrees Celsius (35° C.) to about seventy-five degrees Celsius (75° C.), and even more preferably within the range of about thirty-five degrees Celsius (35° C.) to about sixty-five degrees Celsius (65° C.). And to be clear, such heat management challenges are not unique to thermal inkjet contexts or even high duty cycle contexts—kogation effects can result from scaling or deposits on the surfaces of the resistors that then lead to charring or the like directly based on the resistor being heated (induced heat) but can also result from mechanical effects in a variety of inkjet contexts, particularly at high duty cycles yielding high frequency or tympanic vibrations that in turn produce friction and thus heat (generated heat) that can then lead to similar scaling or kogation issues for the particular printhead (thermal inkjet, piezoelectric, etc.).

Accordingly, in the exemplary embodiments of an ink composition according to aspects of the present invention, 1,3-propanediol and 1,2-hexanediol were employed as heat management or anti-kogation ingredients as noted above, though as noted below propylene glycol in the ink formulation serves this purpose as well. 1,3-propanediol is an organic compound with the formula $CH_2(CH_2OH)_2$ having a heat tolerance capacity but that is alone insufficient, at least in appropriate quantities in the finished ink composition, to address kogation or heat tolerance of the ink satisfactorily. Thus, uniquely, the exemplary ink compositions also include 1,2-hexanediol, a chemical commonly used as a preservative or emollient, with the chemical formula $C_6H_{14}O_2$, as a further anti-kogation agent or means of preventing scale formation on heated surfaces, which compound was found to also work well in the context of a pigment dispersion-based inkjet ink. The 1,3-propanediol alone, represented as weight or mass percent in the finished formula, might be present in an ink composition according to aspects of the present invention in the range of about one percent (1%) to about fifteen percent (15%) by weight, more preferably in the range of about two percent (2%) to about ten percent (10%) by weight, and even more preferably in the range of about three percent (3%) to about seven percent (7%) by weight. And similarly, the 1,2-hexanediol alone, represented as weight or mass percent in the finished formula, might be present in an ink composition according to aspects of the present invention in the range of about one percent (1%) to about fifteen percent (15%) by weight, more preferably in the range of about two percent (2%) to about ten percent (10%) by weight, and even more preferably in the range of about three percent (3%) to about seven percent (7%) by weight. Fundamentally, aspects of the present invention relate to an ink composition having an effective amount of 1,3-propanediol and/or 1,2-hexanediol to cooperate in helping to prevent or mitigate against kogation at relatively high print rates or duty cycles, wherein a scale preventer is necessary over and above other more common high heat capacity solvents that also provide anti-kogation to a secondary or lesser extent.

In a still further exemplary embodiment of an ink composition according to aspects of the present invention, propylene glycol in relatively high concentration was substituted for 1,3-propanediol and 1,2-hexanediol in the formulation to yield a relatively higher viscosity ink. More particularly, the amount of propylene glycol in the finished formulation was significantly increased as compared to other formulations, with 1,3-propanediol and 1,2-hexanediol removed altogether, though not necessarily so. Propylene glycol, also referred to as propane-1,2-diol, is a viscous, colorless liquid having the chemical formula $CH_3CH(OH)CH_2OH$ and so containing two alcohol groups, and is thus classed as a diol, and is miscible with a broad range of solvents, including water. The propylene glycol alone, represented as weight or mass percent in the finished formula, might be present in an ink composition according to aspects of the present invention in the range of about twenty percent (20%) to about sixty percent (60%) by weight, more preferably in the range of about thirty percent (30%) to about fifty-eight percent (58%) by weight, and even more preferably in the range of about forty percent (40%) to about fifty-five percent (55%) by weight. In some alternative exemplary formulations other solvents may be included with the propylene glycol as well, including but not limited to glycerin, hydroxy propyl cellulose ("HPC"), and/or hydroxy propyl methyl cellulose ("HPMC"), in such quantities as appropriate to the application or commercial context, such as to adjust the ink viscosity to suit a particular printhead, for example. Particularly, it will be appreciated that HPC and HPMC as water-soluble polymers provide a different means of adjusting the viscoelasticity of the resulting inks as may be required or beneficial in some printing contexts for clean drop breakoff (to prevent build-up of ink on the faceplate of the printhead) and image acuity, as such non-volatiles rapidly increase the resistance to flow as compared to water and other evaporating ingredients, such as alcohols and lower polyols, and any case HPS and HPMC would thus only be employed to increase viscosity in relatively high viscosity ink printing applications (e.g., piezoelectric ("PZT") printheads and contact printing technologies such as pad or transfer printing, in any case HPC and/or HPMC typically being present in the ink in the range of about a hundredth percent (0.01%) to about five percent (5%).

Polyols may generally be added to various ink compositions of the present invention for their humectant property and as further providing for heat stability or capacity, as already noted above regarding 1,3-propanediol and 1,2-hexanediol in the exemplary formulations. Humectants may play an important role in any ink formulation in preventing crusting at the nozzles in addition to heat management. Relatively fast drying inks of the type described in the various inventive embodiments of the present invention might be more susceptible to nozzle crusting than slower drying inks of the prior art, i.e., conventional aqueous ink compositions for thermal inkjet printing systems. Polyols suitably employed in the ink compositions of the present invention may include, but are not limited to, ethylene glycol, diethylene glycol, triethylene glycol, tetraethylene glycol, propylene glycol, dipropylene glycol, tripropylene glycol, glycerin, glycerol, propanediol, butanediol, pentanediol, hexanediol, polyethylene glycol 200, polyethylene glycol 400, polyethylene glycol 600, and derivatives thereof. In an exemplary embodiment of the present invention, in a thermal inkjet ("TIJ") printhead context or in a piezoelectric ("PZT") printhead context wherein an ink having a viscosity comparable to a TIJ ink may be employed, for example, including but not limited to those exemplary formulations in Examples #1-A to 1-D and 2-A below, one or more polyol might be present in an ink composition according to aspects of the present invention, represented as weight or mass percent in the finished formula, in the range of about one percent (1%) to about twenty percent (20%) by weight, more preferably in the range of about three percent (3%) to about fifteen percent (15%) by weight, and even more preferably in the range of about five percent (5%) to about twelve percent (12%) by weight. By way of further illustration and not limitation, in other piezoelectric ("PZT") printhead contexts requiring relatively higher viscosity inks not suitable for typical TIJ printheads, for example, including but not limited to those exemplary formulations in Examples #3 and 4 below, one or more polyol might be present in an ink composition according to aspects of the present invention, represented as weight or mass percent in the finished formula, in the range of about twenty percent (20%) to about sixty percent (60%) by weight, more preferably in the range of about twenty-five percent (25%) to about fifty-eight percent (58%) by weight, and even more preferably in the range of about thirty percent (30%) to about fifty-five percent (55%) by weight.

The total portion of any such exemplary ink formulation according to aspects of the present invention involving anti-kogation or heat management solvents, or solvents or agents with relatively higher specific heat or heat capacity, represented as weight or mass percent in the finished formula, as including but not limited to 1,3-propanediol and/or 1,2-hexanediol, as well as other solvents such as the polyols or humectants discussed immediately above, particularly propylene glycol and/or other glycols as in the exemplary formulations provided herein, might be present in an ink composition according to aspects of the present invention in the range of about ten percent (10%) to about sixty percent (60%) by weight, more preferably in the range of about twelve percent (12%) to about fifty-eight percent (58%) by weight, and even more preferably in the range of about thirteen percent (13%) to about fifty-five percent (55%) by weight. The effective concentration of such solvents may depend on the percentage by weight of such solvents required in the ink composition to produce the desired heat tolerance, which in turn would depend on the particular printing system, and specifically the typical or sustained temperatures in use and other factors, such as the effective concentration or particle or solids quantity and size or density of the particular pigment dispersion.

In terms of the mechanism of heat generation and thus the need for such heat capacity and management of the ink composition as a function of its components, it has been observed and will be appreciated by those skilled in the art that in the thermal inkjet ("TIJ") context the rising of the temperature of the ink cartridge at high rates of printing results from heat generated from the resistor and/or the frequency of vibration, which in turn drives nucleate boiling and the ink surrounding the nucleate bubble absorbing the heat. Similarly, in piezo or piezoelectric ("PZT") printheads, whether or not a heater or heating element is provided and/or employed, heat is generated by long periods of high frequency mechanical vibration of the piezoelectric crystal and its surroundings particularly at high duty cycles of marking large amounts of continuously produced laundry products or the like (long and/or high frequency operation). The quantity of heat generated is referenced by the rise in the observed temperature of the overall cartridge, especially in close vicinity of the piezoelectric crystal of the printhead, and this is the mechanism governing the absorption of heat by the ink, or the need thereof, which heat is the product of the mass of ink times the specific heat of the ink and the numerical rise in temperature of the mass of ink. While there is no control of the mass of ink and the rise in energy for a particular printer or printing application (type of printhead and duty cycle), it is possible to control the heat capacity of the ink via its components, namely, the high boiling point co-solvents, such as the indicated polyols (e.g., propylene glycol). Tuning the ink via the weight percent of such components provides the control or time taken to heat the ink to a range where rheological properties are out of range for the ink to respond synchronously to the driving mechanism, thereby reducing the rate at which the ink heats up. That is, the effective ink harmonic is substantially in sync with the printhead harmonic via the "tuning" of the ink, which waveform tuning is particularly applicable in the piezo context. Once more, those skilled in the art will appreciate that such tuning, or adjusting the viscoelastic properties, can be achieved employing components (e.g., co-solvents such as polyols) including but not limited to those set forth herein, which are to be understood as illustrative of aspects of the present invention and non-limiting.

To complete the discussion of various solvents as might be employed in various combinations in an ink composition according to aspects of the present invention, alcohol may typically be employed as a secondary solvent in various ink compositions of the present invention, if at all, to modify the drying property of the resulting ink. Alcohols suitable for the ink compositions of the present invention may include, but are not limited to, methanol, ethanol, isopropyl alcohol, n-propyl alcohol, tert-butanol, n-pentanol, benzyl alcohol, and derivatives thereof. For example, isopropyl alcohol may be added to an ink composition of the present invention to increase the drying rate. An effective concentration of alcohol may be empirically determined relative to the desired end use application to balance between the problem of crusting at the nozzles and achieving the desired drying rate. In an exemplary embodiment of the present invention, one or more alcohols might be present in an ink composition according to aspects of the present invention, represented as weight or mass percent in the finished formula, in the range of about a half percent (0.5%) to about twenty percent (20%) by weight, more preferably in the range of about three-quarter percent (0.75%) to about eighteen percent (18%) by weight, and even more preferably in the range of about one percent (1%) to about fifteen percent (15%) by weight. More particularly, once again in a thermal inkjet ("TIJ") or appropriate piezoelectric ("PZT") printhead context, for example, the alcohol(s) represented as weight or mass percent in the finished formula may be in the range of about a half percent (0.5%) to about five percent (5%) by weight, more preferably in the range of about three-quarter percent (0.75%) to about four percent (4%) by weight, and even more preferably in the range of about one percent (1%) to about three percent (3%) by weight, and in another piezoelectric ("PZT") printhead context with related ink viscosity requirement, for example, the alcohol(s) represented as weight or mass percent in the finished formula may be in the range of about three percent (3%) to about twenty percent (20%) by weight, more preferably in the range of about five percent (5%) to about fifteen percent (15%) by weight, and even more preferably in the range of about eight percent (8%) to about twelve percent (12%) by weight.

In addition to any of the aforementioned solvents in various combinations, one or more further additives may be included in an ink composition according to aspects of the present invention for additional functionality or effect. For example, an antimicrobial additive may be included in an exemplary ink composition according to aspects of the present invention, including but not limited to Proxel GXL™ antimicrobial solution manufactured by Arch Chemicals, Inc., which broad spectrum biocide may be employed for the preservation of industrial water-based products such as the instant ink compositions against spoilage from bacteria, yeasts and fungi. Further, one or more surfactants or wetting agents may be added to an exemplary ink composition according to aspects of the present invention, including but not limited to DOSS-70 or sodium dioctyl sulfosuccinate 70%, an anionic surfactant manufactured by Expo, Dynol™ 604, an ultra low-VOC, low-foam, non-ionic wetting agent and surfactant manufactured by Evonik, and Zonyl™ FSO-100, an ethoxylated, non-ionic fluoro-surfactant that reduces plasticizer migration manufactured by Chemours. Any and all such surfactants, fluoro-surfactants, and antimicrobials may be incorporated in an ink composition according to aspects of the present invention without departing from its spirit and scope.

Various mixtures of the aforementioned solvents may be selected at an effective concentration in terms of percentage by weight for a particular ink formulation or composition and a particular printing application, including substrate and printing system, according to aspects of the present invention, thereby providing balance of the desired properties, as will be appreciated by those skilled in the art. Important properties for selecting appropriate solvents for an oxidation-resistant pigment dispersion-based inkjet ink to print on a wide range of oxidizing and alkaline substrates include one or more of the following: substantial solubility with water; desirable evaporating rate; substantial miscibility with water; relatively low toxicity; relatively low viscosity; and relatively high heat tolerance.

Exemplary Formulations

The following non-limiting examples illustrate oxidation-resistant inkjet ink compositions according to aspects of the present invention in various colors suitable for jetting in various industrial inkjet systems, whether smaller single-use or larger bulk ink cartridges, though thermal inkjet ("TIJ") systems are the exemplary context. The exemplary formulations should not be construed in any way as limitations on the present invention, but should be understood merely as illustrative of the principles of the invention and instructive of at least one preferred ink composition based on current materials and data. The following ink formulations may be made using conventional ink mixing equipment.

In each of Examples #1-A to 1-D and 2-A such exemplary, non-limiting green and blue ink compositions according to aspects of the present invention are suitable for jetting in an industrial thermal inkjet system such as the FlexCode™ printer available from Independent Ink, Inc. employing single use cartridges or bulk printing cartridges such as from Hewlett-Packard or Funai/Lexmark and/or bulk feed systems or components such as bags and valves.

TABLE 1

Low to high duty cycle TIJ green ink

| Ink Formula (as percent by weight) | 1-A | 1-B | 1-C | 1-D |
|---|---|---|---|---|
| 1,3-propanediol | 5.39 | 5.39 | 4.73 | 4.17 |
| Isopropyl alcohol (propan-2-ol) | 2.82 | 2.82 | 2.84 | 2.45 |
| Deionized water | 71.39 | 71.43 | 71.72 | 74.61 |
| Polyethylene glycol 600 | 5.22 | 5.22 | 5.21 | 4.65 |
| Pigment Yellow 155 | 2.12 | 2.12 | 2.20 | 2.16 |
| Pigment Blue 15.3 | 0.67 | 0.67 | 0.60 | 0.75 |
| 1,2-hexanediol | 5.55 | 5.55 | 4.73 | 4.20 |
| Propylene glycol | 6.60 | 6.60 | 7.73 | 2.73 |
| Diethylene glycol | | | | 4.10 |
| Proxel GXL | 0.08 | 0.08 | 0.09 | 0.08 |
| Expo Doss 70 | 0.16 | | | |
| Dynol 604 | | 0.12 | 0.09 | 0.10 |
| FSO-100 | | | 0.06 | |
| TOTAL | 100.00 | 100.00 | 100.00 | 100.00 |

TABLE 2

Low to high duty cycle TIJ blue ink

| Ink Formula (as percent by weight) | 2-A |
|---|---|
| 1,3-propanediol | 5.36 |
| Isopropyl alcohol (propan-2-ol) | 2.81 |
| Deionized water | 70.15 |
| Polyethylene glycol 600 | 5.20 |
| Pigment Red 122 | 1.35 |
| Pigment Blue 15.3 | 3.00 |
| 1,2-hexanediol | 5.53 |
| Propylene glycol | 6.40 |
| Proxel GXL | 0.08 |
| Dynol 604 | 0.12 |
| TOTAL | 100.00 |

In Examples #1-A through 1-D yielding a green ink (nominally PMS Green 2423U), Pigment Yellow 155 and Pigment Blue 15.3 pigments or pigment dispersions were employed. And in Example #2-A yielding a blue ink (nominally PMS Blue 2145U), Pigment Red 122 and Pigment Blue 15.3 pigments or pigment dispersions were employed. Again, a virtually infinite variety of colors of the finished, printed and dried ink and thus of the one or more colorants employed are possible according to aspects of the present invention, such that the illustrative pigments and resulting printed ink colors are to be understood as illustrative and non-limiting.

In such exemplary formulations of Examples #1-A through 2-A and resulting ink compositions according to aspects of the present invention, the resulting viscosity of the ink may be in the range of 1.5-4.0 cPs at 25° C., and the resulting surface tension of the ink may be in the range of 20-40 Dynes per cm.

In each of Examples #3 and 4 such exemplary, non-limiting green and blue ink compositions according to aspects of the present invention are suitable for jetting in an industrial piezoelectric inkjet system such as the FlexPrint™ IL 500 printer available from Independent Ink, Inc. employing a Ricoh piezoelectric printhead such as the GH2220 printhead. And in any case, such a piezo printing system may involve in addition to the printer and printhead, a bulk ink container, preferably a constant level second ink container, a damper which suppresses surges and rarities, and a set of tubes that connect the various components for supplying or circulating the ink in the system.

TABLE 3

Low to high duty cycle green piezo inkjet ink

| Ink Formula (as percent by weight) | 3-A |
|---|---|
| Deionized water | 32.76 |
| Propylene glycol | 54.58 |
| Ethanol 64-17-5 | 7.96 |
| 2-Propanol 67-63-0 | 0.83 |
| Methanol 67-56-1 | 0.40 |
| Methyl isobutyl ketone 108-10-1 | 0.08 |
| Pigment Yellow 155 | 2.59 |
| Pigment Blue 15.3 | 0.80 |
| TOTAL | 100.00 |

TABLE 4

Low to high duty cycle blue piezo inkjet ink

| Ink Formula (as percent by weight) | 4-A |
|---|---|
| Deionized water | 34.48 |
| Propylene glycol | 51.78 |
| Ethanol 64-17-5 | 8.55 |
| 2-Propanol 67-63-0 | 0.89 |
| Methanol 67-56-1 | 0.43 |
| Methyl isobutyl ketone 108-10-1 | 0.09 |
| Pigment Blue 15.3 | 2.87 |
| Pigment Red 122 | 0.91 |
| TOTAL | 100.00 |

It is noted that the ethanol, 2-propanol, methanol, and methyl isobutyl ketone in the above exemplary ink composition formulations may be supplied together in a single solution as A-1 200-proof ethanol or any other such supplied solution as appropriate, whether now known or later developed.

In any such exemplary ink compositions according to aspects of the present invention for printing in a piezo inkjet printer or system, other co-solvents may be employed instead of or in addition to the co-solvents as noted above, with the w/w percentages adjusted accordingly, for the primary purpose of raising and maintaining viscosity or adjusting viscosity and/or surface tension for stable or optimum jetting and image quality, including but not limited to propylene glycol, 1,3-propanediol, 1,2-hexanediol, isopropyl alcohol, and ethanol, such as in exemplary ink compositions for use in inkjet printers and systems as set forth herein by way of illustration and not limitation.

In Example #3-A, a green ink (nominally PMS Green 2423U), Pigment Yellow 155 and Pigment Blue 15.3 pigments or pigment dispersions were employed. And in Example #4-A yielding a blue ink (nominally PMS Blue 279U), Pigment Blue 15.3 and Pigment Red 122 pigments or pigment dispersions were employed. Again, a virtually infinite variety of colors of the finished, printed and dried ink and thus of the one or more colorants employed are possible according to aspects of the present invention, such that the illustrative pigments and resulting printed ink colors are to be understood as illustrative and non-limiting.

In the exemplary formulations of Examples #3 and 4 and resulting ink compositions according to aspects of the present invention, the resulting viscosity of the ink may be in the range of 6.5-12.0 cPs at 25° C., and the resulting surface tension of the ink may be in the range of 20-50 Dynes per cm.

In all exemplary formulations, the weight or mass percentages are for the finished formula and thus those represented for the pigments are the amounts of actual pigment or the mass of particles in suspension, with all water in the case of a pigment liquid suspension or dispersion included in the weight percentage for deionized ("DI") water.

In use of oxidation-resistant ink compositions according to aspects of the present invention, such may again be employed in a single use cartridge or an industrial or bulk inkjet cartridge, including but not limited to those cartridges available from Hewlett-Packard and Funai/Lexmark, along with any related printhead and inkjet system now known or later developed, such as the FlexCode™ printer available from Independent Ink, Inc., in the illustrative thermal inkjet context, and the FlexPrint™ IL-500 printer and related Ricoh GH2220 printhead in the piezoelectric inkjet context, and in any case whether or not in combination with a bulk feed cartridge or related bulk feed system in a manner known in the art, here with the unique capability of the ink compositions of the present invention of printing on a variety of oxidizing and alkaline substrates or surfaces such as laundry detergent tablets or the like containing percarbonates or other readily oxidizing agent or other fabric care product, bath and bar soap, and other contexts having an oxidating and alkaline surface or substrate on which to print, whether or not having percarbonate, carbonate, or bicarbonate salt specifically as an active ingredient. It will be appreciated by those skilled in the art that particularly such industrial or bulk inkjet printing systems may often be configured to operate with relatively high throughput and relatively large ink supply, such as a nominal one liter (1 L) cartridge or well or bulk feed system, such as a Funai Claron 1.0 TIJ ink cartridge, and to operate at a relatively high rate or frequency or duty cycle, with attendant challenges relating to managing temperature and pressure within the cartridge and the tendency of kogation that exemplary ink compositions according to aspects of the present invention as disclosed herein mitigate against. By way of further illustration and not limitation, a piezoelectric printhead such as available from Ricoh, Epson, Toshiba, Konica, and Xaar and related single-use or bulk feed cartridge or system may be employed along with any suitable printer or printing system now known or later developed in conjunction with ink compositions according to aspects of the present invention. It will be further appreciated that a variety of other industrial contexts, both in terms of the particular inkjet, piezo, or other printing system and the substrate or surface to be printed on, are possible according to aspects of the present invention, the exemplary applications being understood as merely illustrative of features and aspects of the invention and non-limiting.

EXAMPLE 1

Green Ink Bulk Printing (Prophetic)

This example demonstrates preparing and printing of a nominally green inkjet ink. The ink was mixed using conventional ink mixing equipment and techniques such that the weight percentages of the components in the resulting ink were 71.39% deionized water, 5.39% 1,3-propanediol, 5.55% 1,2-hexanediol, 5.22% polyethylene glycol 600, 2.82% isopropyl alcohol (propan-2-ol), 6.60% propylene glycol, 0.08% Proxel GXL biocide, 0.16% Expo Doss 70 surfactant, 2.12% Pigment Yellow 155 pigment, and 0.67% Pigment Blue 15.3 pigment (Formulation 1-A in Table 1). At ambient conditions of 25° C. and one atmosphere, the ink's viscosity measured 2.7 cPs and its surface tension measured 33 Dynes per cm. The ink was then loaded in a FlexCode™ industrial thermal inkjet system from Independent Ink, Inc. employing a Funai Claron 1.0 bulk feed cartridge. The printer was configured for printing a 100 mm long text and graphic image on test stock containing percarbonate salt, to simulate laundry detergent tablets and other such oxidizing and alkaline substrates, at a nominal rate of about 20 prints per second. Specifically, over a period of roughly fifteen hours, approximately 1,000,000 prints were laid down with sufficient image quality in the range of 300-350 dpi and having a Pantone color of PMS Green 2423U. Such bulk printing of roughly 1,000,000 images consumed approximately 1,400 mL of ink, which is thus the volume of ink that was fed through the cartridge. At the start of printing, the temperature within the cartridge measured 52° C., by about the midpoint of printing the temperature was 73° C. and at the last print roughly fifteen hours and 1,000,000 prints later the temperature was 78° C. Visual observation of the printed images over time following printing revealed no appreciable color fading or image degradation due to the percarbonate salt in the substrate or otherwise.

EXAMPLE 2

Blue Ink Bulk Printing (Prophetic)

This example demonstrates preparing and printing of a nominally blue inkjet ink. The ink was mixed using conventional ink mixing equipment and techniques such that the weight percentages of the components in the resulting ink were 70.15% deionized water, 5.36% 1,3-propanediol, 5.53% 1,2-hexanediol, 5.20% polyethylene glycol 600, 2.81% isopropyl alcohol (propan-2-ol), 6.40% propylene glycol, 0.08% Proxel GXL biocide, 3.00% Pigment Blue 15.3 pigment, and 1.35% Pigment Red 122 pigment (Formulation 2-A in Table 2). At ambient conditions of 25° C. and one atmosphere, the ink's viscosity measured 3.6 cPs and its surface tension measured 26 Dynes per cm. The ink was then loaded in a FlexCode™ industrial thermal inkjet system from Independent Ink, Inc. employing a Funai Claron 1.0 bulk feed cartridge. The printer was configured for printing a 100 mm long text and graphic image on test stock containing percarbonate salt, to simulate laundry detergent tablets and other such oxidizing and alkaline substrates, at a nominal rate of about 20 prints per second. Specifically, over a period of roughly sixteen hours, approximately 1,100,000 prints were laid down with sufficient image quality in the range of 300-350 dpi and having a Pantone color of PMS Blue 279U. Such bulk printing of roughly 1,100,000 images consumed approximately 1,450 mL of ink, which is thus the volume of ink that was fed through the cartridge. At the start of printing, the temperature within the cartridge measured 53° C., by about the midpoint of printing the temperature was 74° C. and at the last print roughly sixteen hours and 1,100,000 prints later the temperature was 79° C. Visual observation of the printed images over time following printing revealed no appreciable color fading or image degradation due to the percarbonate salt in the substrate or otherwise.

EXAMPLE 3

Green Ink Bulk Printing (Prophetic)

This example demonstrates preparing and printing of a nominally green inkjet ink. The ink was mixed using conventional ink mixing equipment and techniques such that the weight percentages of the components in the resulting ink were 32.76% deionized water, 54.58% propylene glycol, 9.27% A-1 200 proof ethanol, 2.59% Pigment Yellow 155 pigment, and 0.80% Pigment Blue 15.3 pigment (Formulation 3-A in Table 3). At ambient conditions of 25° C. and one atmosphere, the ink's viscosity measured 8.5 cPs and its surface tension measured 35 Dynes per cm. The ink was then loaded in a FlexPrint™ IL 500 industrial inkjet system from Independent Ink, Inc. employing a Ricoh GH2220 piezoelectric printhead, a nominally one liter (1 L) bulk ink container, a constant level nominally one liter (1 L) second ink container, a damper, and interconnected tubing for supplying or circulating the ink in the system. The printer was configured for printing a 100 mm long text and graphic image on test stock containing percarbonate salt, to simulate laundry detergent tablets and other such oxidizing substrates, at a nominal rate of about 20 prints per second. Specifically, over a period of roughly fifteen hours, approximately 1,000,000 prints were laid down with sufficient image quality in the range of 350-400 dpi and having a Pantone color of PMS Green 2423U. Such bulk printing of roughly 1,000,000 images consumed approximately 1,400 mL of ink, which is thus the volume of ink that was fed through the printhead. At the start of printing, the temperature of the ink within the printhead measured 48° C., by about the midpoint of printing the temperature was 71° C. and at the last print roughly fifteen hours and 1,000,000 prints later the temperature was 76° C. Visual observation of the printed images over time following printing revealed no appreciable color fading or image degradation due to the percarbonate salt in the substrate or otherwise.

In closing, regarding the exemplary embodiments of the present invention as shown and described herein, it will be appreciated that a method of satisfactorily printing even at high duty cycle on oxidizing and alkaline substrates or surfaces employing an ink composition suitable for thermal inkjet, piezo, and other printing contexts is disclosed. Because the principles of the invention may be practiced in a number of embodiments beyond those described, it is to be understood that the invention is not in any way limited by the exemplary embodiments, but is generally directed to such ink compositions and methods of their use according to aspects of the present invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor(s) believe that the claimed subject matter is the invention.

What is claimed is:

1. A method of printing comprising:
    applying an ink composition onto an oxidizing and alkaline substrate as a print, the ink composition comprising:
        water;
        from 10 wt. % to 72 wt. % at least one solvent; and
        from 1 wt. % to 10 wt. % at least one pigment;
    wetting the surface of the oxidizing and alkaline substrate via the water in the ink composition so as to cause the oxidizing and alkaline substrate to release nascent oxygen; and
    stabilizing the ink composition on the surface of the oxidizing and alkaline substrate in the presence of the nascent oxygen via the resistance to oxidation of the least one pigment;
    wherein the at least one pigment is loaded in the ink composition sufficiently to meet print color and optical density requirements for application onto the oxidizing and alkaline substrate while the ink composition still also meets duty cycle requirements via the at least one solvent.

2. The method of claim 1 wherein the oxidizing and alkaline substrate is selected from the group consisting of a laundry tablet, a laundry sheet, a soap tablet, a dishwashing tablet, and a coffee machine cleaning tablet.

3. The method of claim 1 wherein the duty cycle requirements include at least 750,000 prints within sixteen hours.

4. The method of claim 3 wherein the step of applying an ink composition comprises ink jetting.

5. The method of claim 4 wherein the ink jetting involves a bulk cartridge with a capacity of at least one liter.

6. The method of claim 4 wherein the ink jetting involves a printhead and the duty cycle requirements further include maintaining the temperature of the ink composition within the printhead below 85° C.

7. The method of claim 6 wherein the ink jetting involves a thermal inkjet printhead and the at least one solvent of the ink composition comprises one or more of from 1 wt. % to 20 wt. % at least one polyol and from 0.5 wt. % to 5 wt. % at least one alcohol.

8. The method of claim 6 wherein the ink jetting involves a piezoelectric printhead and the at least one solvent of the ink composition comprises one or more of from 20 wt. % to 60 wt. % at least one polyol and from 3 wt. % to 20 wt. % at least one alcohol.

9. The method of claim 3 wherein the ink composition comprises an effective amount of the at least one solvent to manage heat and mitigate against kogation.

10. The method of claim 9 wherein the at least one solvent of the ink composition comprises one or more of 1,3-propanediol, 1,2-hexanediol, and propylene glycol.

11. The method of claim 10 wherein the at least one solvent of the ink composition comprises from 1 wt. % to 25 wt. % total 1,3-propanediol and 1,2-hexanediol.

12. The method of claim 11 wherein the at least one solvent of the ink composition comprises from 1 wt. % to 15 wt. % 1,3-propanediol.

13. The method of claim 11 wherein the at least one solvent of the ink composition comprises from 1 wt. % to 15 wt. % 1,2-hexanediol.

14. The method of claim 10 wherein the at least one solvent of the ink composition comprises from 20 wt. % to 60 wt. % propylene glycol.

15. The method of claim 14 wherein the at least one solvent of the ink composition further comprises from 0.01 wt. % to 5 wt. % one or more of hydroxy propyl cellulose and hydroxy propyl methyl cellulose.

16. The method of claim 9 wherein the at least one solvent of the ink composition is selected from the group consisting of alcohols, amines, esters, glycol ethers, ketones, polyols, keto-pyrroles, and derivatives thereof.

17. The method of claim 16 wherein the at least one solvent of the ink composition comprises a polyol selected from the group consisting of ethylene glycol, diethylene glycol, triethylene glycol, tetraethylene glycol, propylene glycol, dipropylene glycol, tripropylene glycol, glycerin, glycerol, propanediol, butanediol, pentanediol, hexanediol, polyethylene glycol 200, polyethylene glycol 400, polyethylene glycol 600, and derivatives thereof.

18. The method of claim 17 wherein the at least one solvent of the ink composition comprises from 1 wt. % to 60 wt. % polyol.

19. The method of claim 9 wherein the at least one solvent of the ink composition comprises two or more of 1,3-propanediol, 1,2-hexanediol, and at least one polyol together from 10 wt. % to 60 wt. %.

20. The method of claim 1 wherein the ink composition comprises an effective amount of the at least one pigment to meet print color and optical density requirements of at least 150 dpi while remaining stable as by resisting oxidation even as nascent oxygen is released from the oxidizing and alkaline substrate when wetted by the ink composition.

21. The method of claim 20 wherein the at least one pigment comprises finely divided particles below 0.5 microns.

22. The method of claim 1 wherein the ratio of the at least one solvent to the at least one pigment is from 1:1 to 60:1.

23. A method of printing comprising:
applying an ink composition onto an oxidizing and alkaline substrate as a print, the oxidizing and alkaline substrate selected from the group consisting of a laundry tablet, a laundry sheet, a soap tablet, a dishwashing tablet, and a coffee machine cleaning tablet, and the ink composition comprising:
from 65 wt. % to 80 wt. % water;
from 3 wt. % to 7 wt. % 1,3-propanediol;
from 3 wt. % to 7 wt. % 1,2-hexanediol;
from 3 wt. % to 7 wt. % propylene glycol;
from 1 wt. % to 4 wt. % isopropyl alcohol;
from 3 wt. % to 7 wt. % polyethylene glycol 600; and
from 2 wt. % to 6 wt. % pigment;
wetting the surface of the oxidizing and alkaline substrate via the water in the ink composition so as to cause the oxidizing and alkaline substrate to release nascent oxygen; and
stabilizing the ink composition on the surface of the oxidizing and alkaline substrate in the presence of the nascent oxygen via the resistance to oxidation of the pigment;
wherein the pigment is loaded in the ink composition sufficiently to meet print color and optical density requirements for application onto the oxidizing and alkaline substrate of at least 150 dpi while the ink composition still also meets duty cycle requirements of at least 750,000 prints within sixteen hours via the 1,3-propanediol, 1,2-hexanediol, propylene glycol, isopropyl alcohol, and polyethylene glycol 600 totaling at least 13 wt. % of the ink composition.

24. A method of printing comprising:
applying an ink composition onto an oxidizing and alkaline substrate as a print, the oxidizing and alkaline substrate selected from the group consisting of a laundry tablet, a laundry sheet, a soap tablet, a dishwashing tablet, and a coffee machine cleaning tablet, and the ink composition comprising:
from 30 wt. % to 40 wt. % water;
from 45 wt. % to 60 wt. % propylene glycol;
from 8 wt. % to 12 wt. % 200 proof ethanol; and
from 2 wt. % to 6 wt. % pigment;
wetting the surface of the oxidizing and alkaline substrate via the water in the ink composition so as to cause the oxidizing and alkaline substrate to release nascent oxygen; and
stabilizing the ink composition on the surface of the oxidizing and alkaline substrate in the presence of the nascent oxygen via the resistance to oxidation of the pigment;
wherein the pigment is loaded in the ink composition sufficiently to meet print color and optical density requirements for application onto the oxidizing and alkaline substrate of at least 150 dpi while the ink composition still also meets duty cycle requirements of at least 750,000 prints within sixteen hours via the propylene glycol and ethanol totaling at least 53 wt. % of the ink composition.

\* \* \* \* \*